(No Model.)
W. B. PORTER.
TRAP FOR EAVES TROUGHS.
No. 317,011. Patented May 5, 1885.
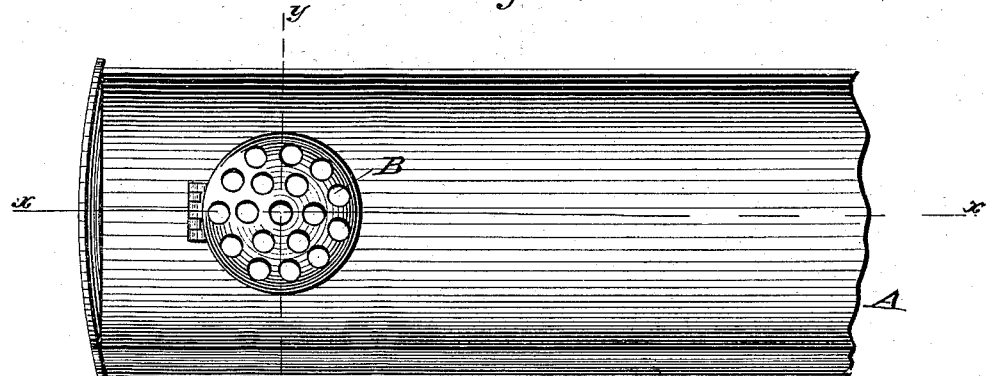
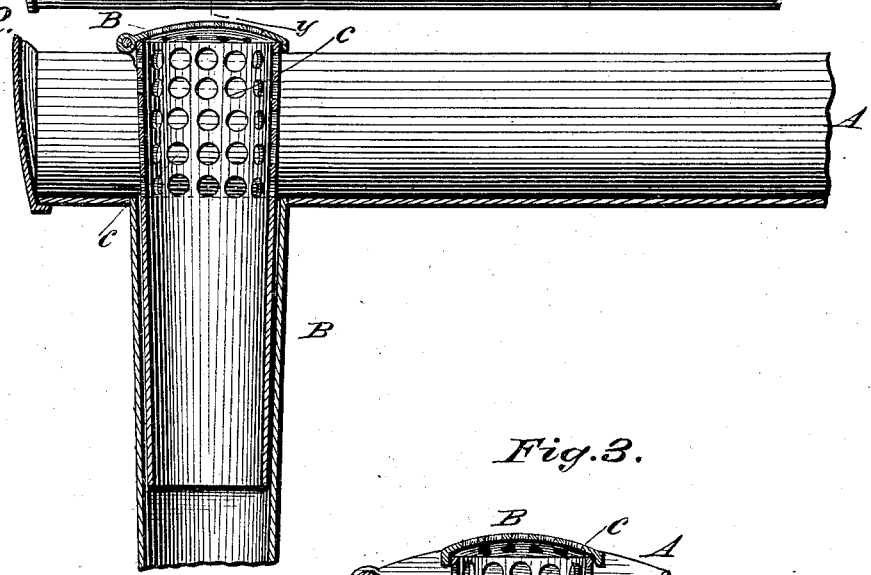
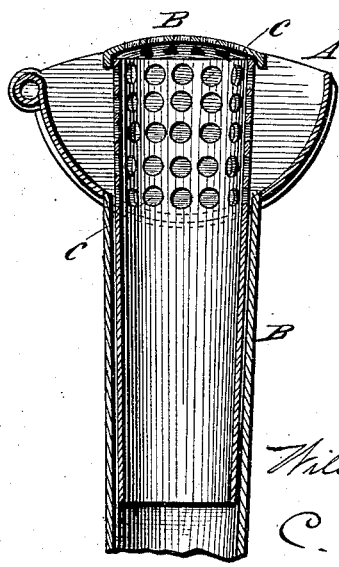
WITNESSES
Phil C. Dieterich.
C. Everett Ellis.
INVENTOR
William B. Porter
By
C. H. Watson & Co.
Attorney

UNITED STATES PATENT OFFICE.

WILLIAM BURTON PORTER, OF TROY, PENNSYLVANIA.

TRAP FOR EAVES-TROUGHS.

SPECIFICATION forming part of Letters Patent No. 317,011, dated May 5, 1885.

Application filed January 31, 1885. (No model.)

*To all whom it may concern:*

Be it known that I, WILLIAM BURTON PORTER, a citizen of the United States, residing at Troy, in the county of Bradford and State of Pennsylvania, have invented certain new and useful Improvements in Traps for Eaves-Troughs, of which the following is a specification, reference being had to the accompanying drawings.

This invention relates to a simple improvement in traps for eaves-troughs, and has for an object to supply effective means by which substances such as twigs, leaves, and the like will be prevented from entering the eduction pipe or conduit which leads from the trough, thereby permitting a perfectly free and uninterrupted flow of the eave-drippings to a suitable place of discharge therefor.

The invention consists, substantially, in the combinations of parts, the trap as constructed, and in such other details as will hereinafter be distinctly described, and pointed out in the claims.

Referring to the annexed sheet of drawings, Figure 1 represents a top or plan view of a portion of eaves-trough in which my improvements are embodied. Fig. 2 is a vertical longitudinal section thereof on the line $x\,x$, and Fig. 3 is a vertical transverse section on the line $y\,y$ of Fig. 1.

In constructing a trap according to my invention I employ a cylindrical section of wire gauze or cloth, perforated tin, zinc, tinned iron, or other suitable material, and preferably form the same slightly conical or tapering in length. This is inserted through the opening in the trough that communicates with the discharge pipe or conduit, and is pushed down sufficiently far in the latter, leaving the upper perforated portion projecting outward about flush or even with the edge of the trough, or more or less, as desired. The eave-drippings will flow through the perforations in the side of the trap and be properly discharged, and it will be quite apparent that all substances or matter too great for the capacity of the discharge-pipe will be restrained from entering the same, and thereby prevent the accumulation therein of such débris as would tend to fill it up and prevent a free and perfect discharge. The said trap is provided with a perforated hinged lid or cover, so that in case of an overflow of the trough, caused by the accumulation of matter around the trap, the discharge capacity of such trap may be increased by simply raising the lid, a further object of such lid or cover being to permit easy insertion of any proper cleaning device without removing the entire trap. The use, however, of any devices for cleaning will rarely, if ever, be found necessary.

Reference being had to the several parts by the letters marked thereon, A represents a portion of an eaves-trough, and B a portion or upper section of the discharge pipe or conduit that communicates with the eduction-port or outlet of said trough, and is secured thereto in the usual or in any well-known manner.

C represents the trap, which fits down into the pipe or conduit B, leaving a sufficient portion of its length projecting upwardly above the bottom of the trough, which projecting end is perforated, as indicated at $c$.

D designates the perforated hinged lid or cover of such trap, which is held down in place when closed by fitting over or partly under an annular flange around the upper edge of the trap, as shown, the outer surface of said lid being preferably slightly convex, by which substances that might accidentally fall upon it will be caused to glance off into the surrounding trough.

As shown, the upper section of the discharge-pipe, as well also as the trap itself, is slightly tapering in length, by which, when the trap is inserted and pushed down a sufficiently-tight connection will be effected.

If desired, the upper section of pipe, B, may be formed similar to the trap itself, and made to extend up through the trough in a like manner, and thus prove equally serviceable; but for all general purposes I prefer to use the trap as a separate article or device that may be used in connection with troughs already suspended or in use. It should be remarked that it is only necessary to perforate as much of the sides of the trap as extends above the bottom of the trough, and it will be obvious that very material changes in the form of construction of the device may be made without departing from the spirit of the invention.

Having thus described my invention, what I claim is—

1. The combination, with an eaves-trough and its discharge-pipe, of a perforated trap extending into the latter and projecting above the bottom of the trough, substantially as described.

2. The combination, with an eaves-trough and a discharge-pipe therefor having its upper portion or section slightly tapering in length, of a correspondingly-tapering perforated trap fitting therein and extending above the bottom of the trough, substantially as described.

3. As an article of manufacture, a trap for eaves-troughs, consisting of a slightly-tapering shell or tube having a perforated hinged lid and provided with perforations in its sides, as set forth.

In testimony whereof I affix my signature in presence of two witnesses.

W. BURTON PORTER.

Witnesses:
C. J. BLOOM,
FRANK. G. PIERCE.